H. L. TANNER.
DYNAMO FIELD REGULATOR.
APPLICATION FILED JULY 25, 1917.
1,377,229.
Patented May 10, 1921.
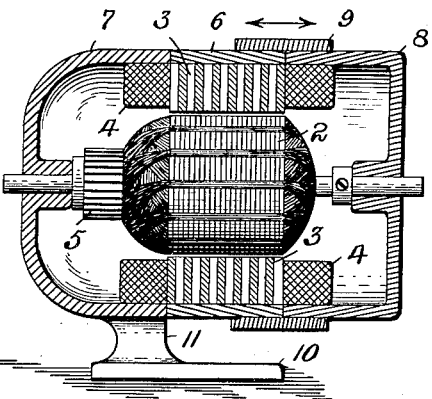
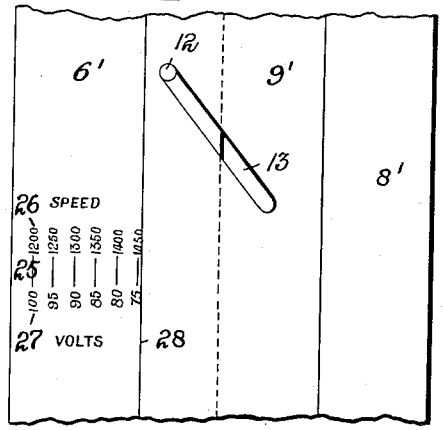
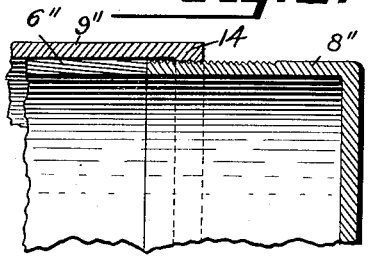
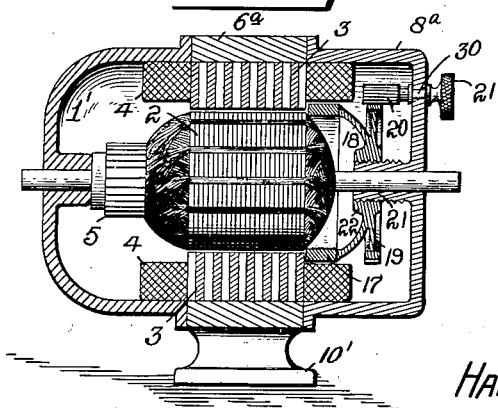
INVENTOR
HARRY L. TANNER
BY
Herbert H. Thompson
ATTORNEY

UNITED STATES PATENT OFFICE.

HARRY L. TANNER, OF BROOKLYN, NEW YORK, ASSIGNOR TO THE TANNER ENGINEERING COMPANY, INC., OF BROOKLYN, NEW YORK, A CORPORATION OF NEW YORK.

DYNAMO-FIELD REGULATOR.

1,377,229.                Specification of Letters Patent.        Patented May 10, 1921.

Application filed July 25, 1917. Serial No. 182,662.

*To all whom it may concern:*

Be it known that I, HARRY L. TANNER, a citizen of the United States of America, residing at 1144 East 19th street, Brooklyn, in the county of Kings and State of New York, have invented certain new and useful Improvements in Dynamo-Field Regulators, of which the following is a specification.

This invention relates to means for regulating the field strength of dynamos, more particularly to that type in which the magneto-motive force is kept constant and the field strength varied by other means.

One of the objects of my invention is to provide a simple and therefore inexpensive method and apparatus for varying the magnetic flux, which passes through the armature of a dynamo, without varying the length of the air gap or the magneto-motive force.

One of the most effective methods of controlling the speed of a motor or the generated E. M. F. of a generator is by varying the flux or number of lines of magnetic force which pass through the armature. This variation may be effected either by varying the magneto-motive force, i. e., the ampere-turns of the field or by varying the reluctance of the path of the field flux.

My invention falls within the latter class and before proceeding further with the disclosure I wish it to be understood that I use the term "dynamo" throughout this specification in its generic sense, i. e., including both motors and generators.

Referring to the drawing which illustrates what I now consider the preferred forms of my invention:

Figure 1 is a longitudinal section of a dynamo embodying one form of my invention.

Fig. 2 is an enlarged fragmentary detail illustrating a modification in the manner of adjusting the parts illustrated in Fig. 1.

Fig. 3 is a view similar to Fig. 2 and illustrates a further modification in the manner of effecting the adjustment and Fig. 4 is a view similar to Fig. 1 but illustrating a modification in the manner of varying the flux passing through the armature.

Referring to Fig. 1 it will be seen that I have shown my invention applied to a direct current dynamo. I wish it to be understood, however, that the invention may be applied to other forms of dynamos as well. The dynamo shown comprises the usual armature 2 having a commutator 5, and field poles 3. The yoke connecting the field poles 3 is different in form, from that of the ordinary dynamo. In the present instance the yoke is made of a plurality of telescoping parts 6, 9 shown as two in number but which number may obviously be increased. The part 9 is made of magnetizable material, such as iron or steel and the part 6 is preferably, although not necessarily, also made of magnetizable material. The parts 6 and 9 are so designed that when they are retracted and the field coils 4 given their normal energization the dynamo, if operating as a motor, will have its lowest desired speed, or, if operating as a generator, will have its highest desired voltage. Also, the design should be such that when the parts 6, 9 are fully extended and the coils 4 energized as assumed above, the dynamo, if operating as a motor, will have its highest desired speed, or, if operating as a generator, its lowest desired E. M. F.

The parts 6 and 9 form a field yoke of variable effective cross-section and hence of varying reluctance so that by sliding the part 9 back and forth in the direction of the arrow in Fig. 1 the speed of the motor, or E. M. F. of the generator may be regulated.

In order to prevent the part 9 from sticking, the inner surface thereof, or the outer surface of part 6 or both of said surfaces may be coated with a non-magnetic material such as brass. Brass is also advantageous in that it is less likely to corrode than iron or steel. This brass layer, which is very thin, may be secured to the iron or steel parts 6 or 9 by welding, soldering, electro-plating or other suitable means.

The end bells 7 and 8 are preferably of non-magnetic material such as aluminum and although one, 7, may assume the ordinary form the other 8 is preferably so constructed as to form a prolongation of the part 6 in order to form a seat for the part 9 (see Fig. 1).

Various means may be provided for moving the part 9. Thus a pin and slot connection may be utilized as shown in Fig. 2. In this figure the parts 6', 8' and 9' correspond to the parts 6, 8 and 9 respectively in Fig. 1. One of the parts 6', 9', shown as 9', is provided with a diagonal slot 13 which receives a pin 12 mounted on the other part 6'. Obviously by rotating the member 9' the latter will be moved in a longitudinal direction thus changing the effective cross-section of the yoke.

Another form of means for adjusting the part 9 is illustrated in Fig. 3, in which the parts 6", 8" and 9" correspond to the parts, 6, 8 and 9 respectively of Fig. 1. The member 9" is shown as provided with an enlarged portion 14 which is screw-threaded on its inner surface to engage screw-threads provided on the outer surface of end bell 8". Obviously by rotating the part 9" the latter will be adjusted longitudinally.

If desirable, an indicating scale 25 may be provided on one of the telescoping parts 6' (6 or 6") which may coöperate with the edge 28 of the other telescoping part 9' (9 or 9", see Fig. 2). This scale may be provided with calibration 26 and 27 so that when operating as a motor the part 9' (9 or 9") may be set to give a desired speed and when operating as a generator the part 9' (9 or 9") may be set to give a desired voltage.

The control, described in detail above, is one in which the reluctance of the magnetic path or circuit is varied by using a variable shunt in that portion of the circuit which mechanically and magnetically connects the field poles. Another form of control is by shunting out more or less of the flux passing through the armature. One form of apparatus for effecting this result is illustrated in Fig. 4.

Referring to the last mentioned figure, it will be seen that the dynamo 1' is shown as comprising parts 2, 3, 4, 5, and 7 similar to those illustrated in Fig. 1. The field yoke, however, is shown as consisting of only one element 6ª, which may be of the ordinary form and dimensions. A member 17 of magnetizable material and preferably of annular form is provided for the purpose of shunting out some of the flux passing through the armature at desired times. Means are provided for moving this member 17 toward and away from the field poles 3. This means is illustrated in the form of a spider 18, and gears 19 and 20.

The member 17 is carried by the spider 18 which is of either magnetic or non-magnetic material such as aluminum or brass. The spider 18 is shown as provided with an internally threaded portion 22 adapted to engage a similarly screw-threaded exterior portion of the journal 21 extending inwardly from end bell 8ª. A gear wheel 19 may be integrally carried by the spider 18, which gear wheel is engaged by a pinion 20 mounted on a shaft 30 suitably journaled in the end bell 8ª. Obviously, by turning a thumb-nut 21, or other means, provided on the shaft 30, the member 18 will be rotated through gear wheels 20 and 19. This rotation will move the member 17 toward or away from the poles 3, 3 thus shunting out a greater or less number of the total lines of magnetic force passing between the poles.

The operation of this form requires little explanation. Assuming that the dynamo 1' is operating as a motor and it is desired to speed it up, the thumb nut 21 is rotated in such a direction as to move the member 17 toward the poles 3. This will cause a larger amount of the total field flux to pass through said member 17 and consequently a smaller amount of the flux to pass through the armature 2 which will cause an increase in the armature speed. The operation, to cause the motor to slow down or to vary the E. M. F. of the dynamo when acting as a generator will be obvious to those skilled in the art in view of the preceding disclosure and needs no further explanation. The two forms of invention illustrated in Figs. 1 and 4 are similar in that in each a portion of the magnetic circuit is shunted by means of a variable shunt. Thus in Fig. 1 the member 9 forms a variable shunt to the member 6. (This also applies to Figs. 2 and 3). In Fig. 4 the member 17 forms a variable shunt to the armature.

Thus I have provided a method and means of controlling the speed of a motor or E. M. F. of a generator which is simple and inexpensive to carry out, which gives a smooth speed or voltage variation and which avoids making and breaking or other manipulation of the electrical circuits.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted and some of the features of each modification may be embodied in the others without interfering with the more general results outlined, and the invention extends to such use.

Having described my invention, what I claim and desire to secure by Letters Patent is:

1. A dynamo-electric machine including a plurality of field poles and an armature, a yoke connecting said poles, a member of magnetic material surrounding and mounted upon said yoke, and means whereby said member may be adjusted axially of the machine.

2. A dynamo comprising a plurality of field poles, a yoke comprising telescoping elements connecting said field poles and means for extending or retracting said yoke upon rotation of one element thereof.

3. A dynamo comprising a plurality of field poles, and a yoke comprising telescoping elements connecting said field poles, the elements of said yoke being connected by a pin and slot connection.

In testimony whereof I have affixed my signature.

HARRY L. TANNER.